US009137127B2

(12) United States Patent
Nowack et al.

(10) Patent No.: US 9,137,127 B2
(45) Date of Patent: Sep. 15, 2015

(54) SYSTEM AND METHOD FOR PROVIDING COMMUNICATION PLATFORM METADATA

(71) Applicant: Twilio, Inc., San Francisco, CA (US)

(72) Inventors: Matthew David Nowack, San Francisco, CA (US); Jonas Boerjesson, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/488,802

(22) Filed: Sep. 17, 2014

(65) Prior Publication Data
US 2015/0081918 A1     Mar. 19, 2015

Related U.S. Application Data

(60) Provisional application No. 61/879,023, filed on Sep. 17, 2013.

(51) Int. Cl.
*G06F 15/16* (2006.01)
*H04L 12/26* (2006.01)
*H04L 29/06* (2006.01)
*G06F 12/00* (2006.01)

(52) U.S. Cl.
CPC ............... *H04L 43/06* (2013.01); *H04L 29/06* (2013.01); *H04L 69/08* (2013.01)

(58) Field of Classification Search
USPC ................................. 709/203, 223–232, 250
See application file for complete search history.

(56) References Cited

U.S. PATENT DOCUMENTS

| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 5,934,181 | A | 8/1999 | Adamczewski |
| 6,026,440 | A | 2/2000 | Shrader et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,206,564 | B1 | 3/2001 | Adamczewski |

(Continued)

FOREIGN PATENT DOCUMENTS

| DE | 1684587 A | 3/1971 |
| EP | 0282126 A | 9/1988 |

(Continued)

OTHER PUBLICATIONS

Complaint for Patent Infringement, Telinit Technologies, LLC v. Twilio Inc., dated Oct. 12, 2012.

(Continued)

*Primary Examiner* — Zarni Maung
(74) *Attorney, Agent, or Firm* — Jeffrey Schox

(57) ABSTRACT

A system and method that includes executing communication processes in an application platform, which comprises on behalf of outside entities, negotiating communications between a set of internal resources and at least one external resource using at least a first communication protocol and a second protocol; capturing internal log information during execution of the application platform; receiving a request to access log information by an outside entity; synthesizing the internal log information of the first protocol and at least a second protocol into a unified communication report; and transmitting the unified communication report.

18 Claims, 14 Drawing Sheets

(56) References Cited

U.S. PATENT DOCUMENTS

| | | |
|---|---|---|
| 6,223,287 B1 | 4/2001 | Douglas et al. |
| 6,269,336 B1 | 7/2001 | Ladd et al. |
| 6,373,836 B1 | 4/2002 | Deryugin et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,081,958 B2 | 12/2011 | Soederstroem et al. |
| 8,103,725 B2 | 1/2012 | Gupta et al. |
| 8,126,128 B1 | 2/2012 | Hicks, Iii et al. |
| 8,149,716 B2 | 4/2012 | Ramanathan et al. |
| 8,150,918 B1 | 4/2012 | Edelman et al. |
| 8,233,611 B1 | 7/2012 | Zettner |
| 8,243,889 B2 | 8/2012 | Taylor et al. |
| 8,266,327 B2 | 9/2012 | Kumar et al. |
| 8,295,272 B2 | 10/2012 | Boni et al. |

(56) References Cited

U.S. PATENT DOCUMENTS

| | | |
|---|---|---|
| 8,306,021 B2 | 11/2012 | Lawson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,462,670 B2 | 6/2013 | Chien et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,594,626 B1 | 11/2013 | Woodson et al. |
| 8,611,338 B2 | 12/2013 | Lawson et al. |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,755,376 B2 | 6/2014 | Lawson et al. |
| 8,806,024 B1 * | 8/2014 | Toba Francis et al. ........ 709/227 |
| 8,837,465 B2 | 9/2014 | Lawson et al. |
| 8,838,707 B2 | 9/2014 | Lawson et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0198941 A1 * | 12/2002 | Gavrilescu et al. ........... 709/205 |
| 2003/0006137 A1 | 1/2003 | Wei et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2005/0010483 A1 | 1/2005 | Ling |
| 2005/0021626 A1 * | 1/2005 | Prajapat et al. ................ 709/205 |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0091572 A1 * | 4/2005 | Gavrilescu et al. ........... 715/500 |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | McQueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0025320 A1 | 1/2008 | Bangalore et al. |
| 2008/0037715 A1 | 2/2008 | Prozeniuk et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0222656 A1 | 9/2008 | Lyman |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0313318 A1 | 12/2008 | Vermeulen et al. |
| 2008/0317222 A1 | 12/2008 | Griggs et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0235349 A1 | 9/2009 | Lai et al. |

(56) References Cited

U.S. PATENT DOCUMENTS

| | | |
|---|---|---|
| 2009/0252159 A1 | 10/2009 | Lawson et al. |
| 2009/0288165 A1 | 11/2009 | Qiu et al. |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0110366 A1 | 5/2011 | Moore et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0017222 A1 | 1/2012 | May |
| 2012/0036574 A1 | 2/2012 | Heithcock et al. |
| 2012/0039202 A1 | 2/2012 | Song |
| 2012/0079066 A1* | 3/2012 | Li et al. .................. 709/217 |
| 2012/0114112 A1 | 5/2012 | Rauschenberger et al. |
| 2012/0149404 A1 | 6/2012 | Beattie et al. |
| 2012/0173610 A1 | 7/2012 | Bleau et al. |
| 2012/0198004 A1 | 8/2012 | Watte |
| 2012/0201238 A1 | 8/2012 | Lawson et al. |
| 2012/0226579 A1 | 9/2012 | Ha et al. |
| 2012/0239757 A1 | 9/2012 | Firstenberg et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0316809 A1 | 12/2012 | Egolf et al. |
| 2013/0058262 A1 | 3/2013 | Parreira |
| 2013/0156024 A1 | 6/2013 | Burg |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0106704 A1 | 4/2014 | Cooke et al. |
| 2014/0123187 A1* | 5/2014 | Reisman .................. 725/38 |
| 2014/0153565 A1 | 6/2014 | Lawson et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 2009018489 A | 2/2009 |
| WO | 2009124223 A | 10/2009 |
| WO | 2010053 7064 A | 4/2010 |
| WO | 2010040010 A | 4/2010 |
| WO | 2010101935 A | 9/2010 |
| WO | 2011091085 A | 7/2011 |

OTHER PUBLICATIONS

RFC 3986: Uniform Resource Identifier (URI): Generic Syntax; T. Berners-Lee, R. Fielding, L. Masinter; Jan. 2005; The Internet Society.

\* cited by examiner

S160

[ Search ]

Errors
46bdsj347e26159 21-JUN 3:15
dhnkwuihdfhw89s 21-JUN 3:12
nxjsdoiucnw8jdfjw 20-JUN 23:45
shjdjksjksksjfjghsj 20-JUN 23:42
cnweio49ckj29isis 20-JUN 23:42
10 more

Warnings
jksd98w4jkdhjsjkd 21-JUN 3:15
cnds9ewnjdjksisdf 20-JUN 23:12
cnw8389dkjhsjkdjs 20-JUN 16:45
shjdfiuwiucdjjdjwui 20-JUN 10:42
3897234uhhe89hf 20-JUN 03:42
22 more

History
dhoiewoijkdlsnsids 21-JUN 3:45
honcncxrhks9iewq 21-JUN 3:45
34934jionro3c0uur 21-JUN 3:45
4389e98hr9r398rh 21-JUN 3:45
2372ehuhd73d23w 21-JUN 3:45
89u9jef9erh9ghgh 21-JUN 3:45
3475hfhnutkxnqlof 21-JUN 3:45
4kcmasn1y4860ds 21-JUN 3:45
100+ more

FIGURE 4

Session: 46bdsj347e26159bc46e2ffsc6a481
13:34:16 PDT 2014-09-10

Expand All

▶ SIP: INVITE from <Caller>

▶ SIP: 100 Trying from <Caller>

▶ SIP: 180 Ringing from <Caller>

▶ HTTP: GET http://www.example.com/phoneApp/

▶ SIP: 183 Session Progress to <Caller>

FIGURE 9A

SYSTEM AND METHOD FOR PROVIDING COMMUNICATION PLATFORM METADATA

CROSS-REFERENCE TO RELATED APPLICATIONS

This application claims the benefit of U.S. Provisional Application Ser. No. 61/879,023, filed on 17 Sep. 2013, which is incorporated in its entirety by this reference.

TECHNICAL FIELD

This invention relates generally to the communication platform field, and more specifically to a new and useful system and method for providing communication platform metadata in the communication platform field.

BACKGROUND

Application platforms are frequently used by other applications and services to supplement or facilitate particular interactions and functionality. The application platforms, in many cases, do not expose logs and analytics about internal platform operations and events. Such information in some cases contains sensitive information. Not only would exposing the logs be a potential security vulnerability to the application platform, but also extracting useful information from the application platform logs would be challenging. In a more specific scenario, communication platforms have numerous challenges in debugging and identifying errors due to dependence on various communication resources internal and external. A user of a communication platform may encounter an error as a result of misconfiguration of their system, of the communication platform, a communication provider, or a particular endpoint participating in a communication. Thus, there is a need in the communication platform field to create a new and useful system and method for providing sanitized platform metadata. This invention provides such a new and useful system and method.

BRIEF DESCRIPTION OF THE FIGURES

FIG. 4 is a schematic representation of an exemplary log report interface;
FIGS. 9A and 9B is an exemplary representation of a unified log report interface.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Providing Communication Platform Metadata

A system for providing communication platform metadata of a preferred embodiment can include a multitenant platform system no, an internal log storage system 120, a log sanitizer 130, and exposed log interface 140. The system functions to clean, organize, and otherwise synthesize event logs, resource metadata, and/or any suitable internal records such that they can be consumed by outside entities in a secure and useful manner. The system preferably exposes event logs across multiple operation modes and more specifically communication modes. Event information of two or more communication protocols as controlled by a communication platform can be exposed. For example, the SIP communication or IP communication protocols can be contextualized with synchronous alignment with application level communication over HTTP or other suitable protocols. The system can be used in exposing routing event logs that abstract out internal information and events of the platform. The system can also be used in processing logs of the system and presenting analysis and classification of the event logs. This can enable improved debugging, analytics, and/or operational insight into use of an application platform by an outside entity.

Figure 1:
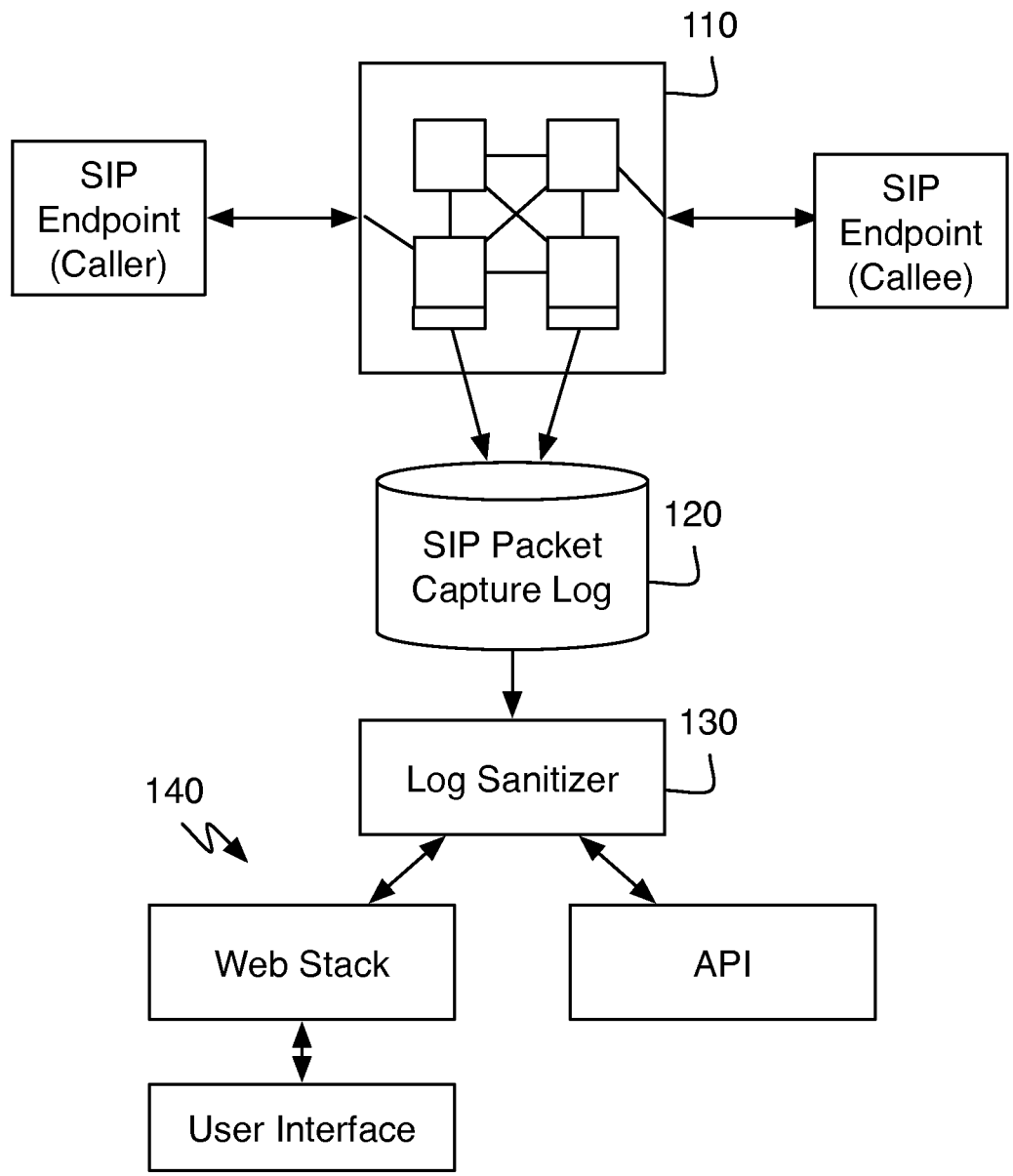
FIG. 1 is a schematic representation of a system for providing sanitized platform metadata of routed communication.
Figure 2:
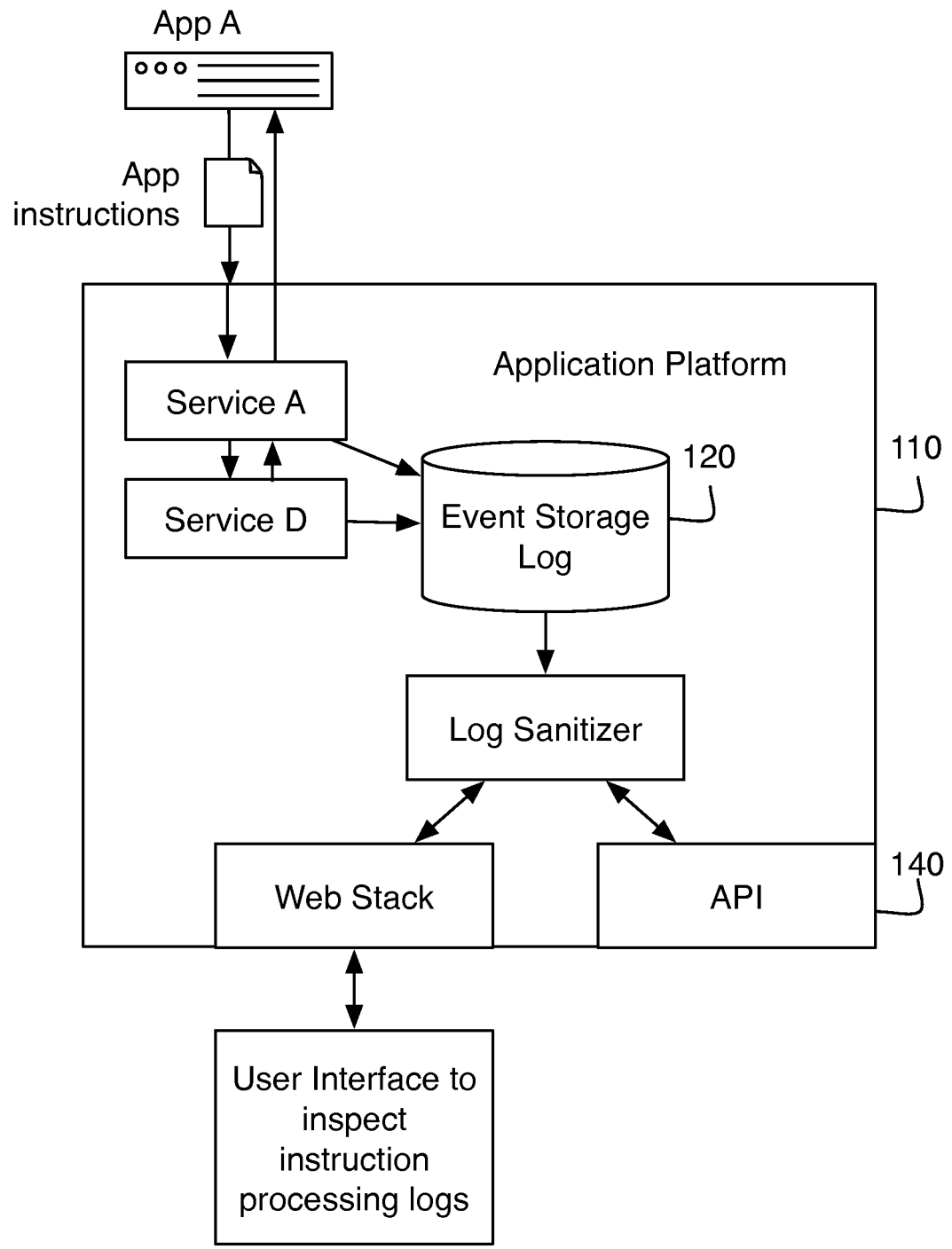
FIG. 2 is a schematic representation of a system for providing sanitized platform metadata of application processing.
Figure 3:
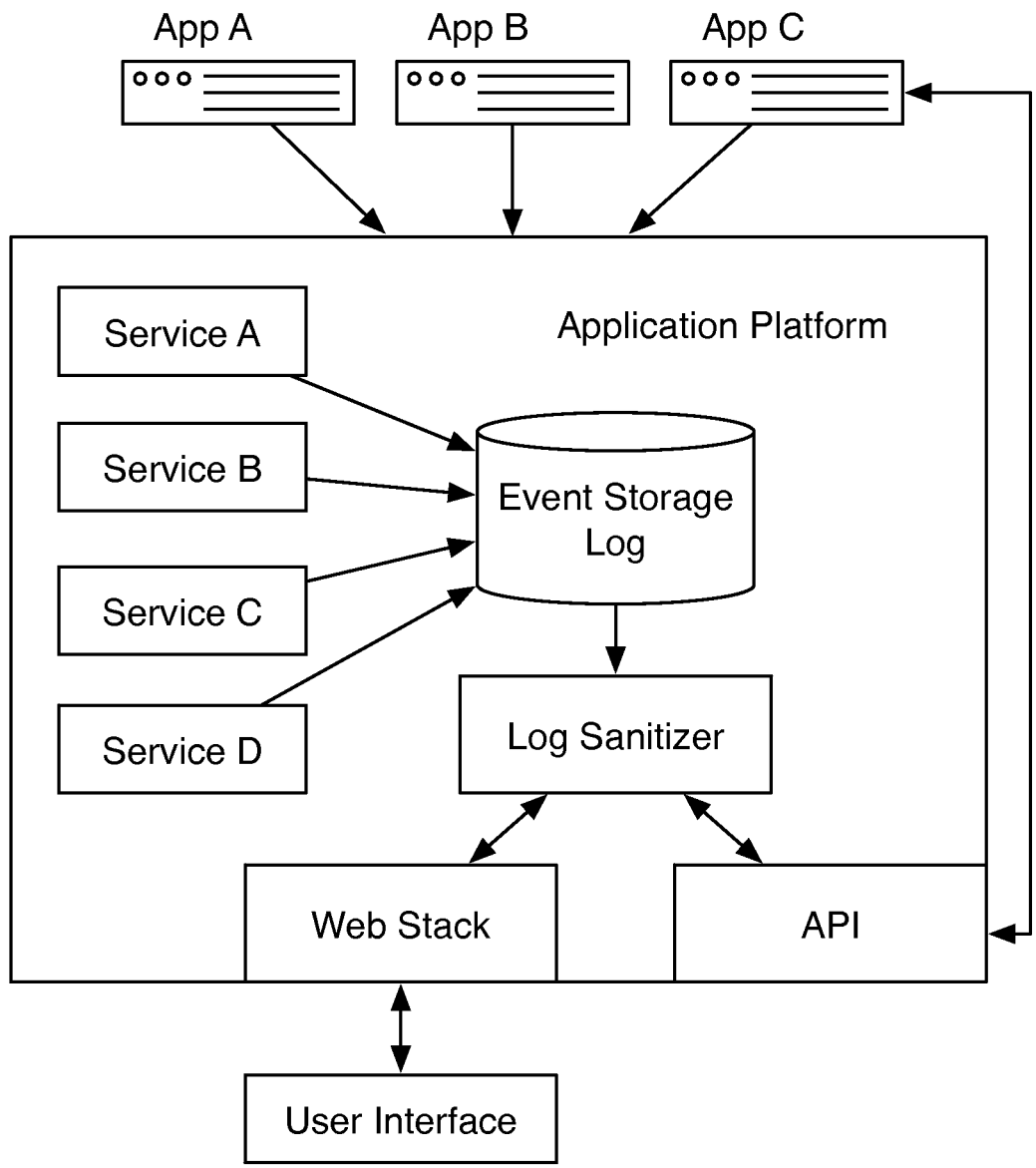
FIG. 3 is a schematic representation of a system for providing sanitized platform metadata of platform resources.

The system in a first implementation is used by a communication platform in sanitizing packets and communication messages with at least one outside entity as shown in FIG. 1. The system can additionally or alternatively be applied to operational trace logs of actions performed by the application platform 110 as shown in FIG. 2. In a third implementation, the system can be applied to metadata of accessible resources of the communication platform. The accessible resources can be accessible over an API, such as a REST API, or through an application programming interface (API) as shown in FIG. 3.

The multitenant platform system 110 of the preferred embodiment functions to perform some task or service on behalf of an outside entity and generate metadata relating to the performed operations. Preferably, the application platform 110 is a multitenant, distributed computing system providing an application programming interface (API). The API preferably operates over an application layer protocol such as HTTP, HTTPS, SPDY or any suitable protocol. The platform can provide a processing service, a communication service, a media service, resource service, and/or any suitable type of service. A communication service can facilitate or manage synchronous or asynchronous communication involving at least one outside endpoint. The application platform 110 preferably provides a service used by outside applications or devices.

An exemplary communication service can include bridging synchronous voice session over a SIP service. An exemplary processing service can include executing application instructions within the application platform 110. The multitenant platform no is substantially similar to the telephony application platform described in patent application Ser. No. 12/417,630 filed 2 Apr. 2009, entitled "System and Method for Processing Telephony Sessions", which is hereby incorporated in its entirety by this reference. A telephony or communication application platform 110 can enable synchronous communication sessions such as voice sessions, video sessions, screen sharing sessions, or any suitable synchronous form of media communication. The communication can be carried out over PSTN channels, SIP channels, IP-based channels, WebRTC, or any suitable communication protocol. The communication application platform 110 can similarly facilitate asynchronous communication such as SMS, MMS, IP-based client application messaging, proprietary platform messaging (e.g., social network messaging), or any suitable form of asynchronous communication. The application platform 110 may alternatively provide any suitable service or be any suitable type of platform.

A telephony application platform 110 preferably includes the combination of a communication based signaling and media protocol that is used for facilitating communication sessions. The telephony application platform 110 will preferably utilize a first protocol such as SIP or any suitable communication protocol. The first protocol is preferably a communication protocol that facilitates initiating an interactive media session (e.g., voice, video, chat, gaming, screen sharing, etc.) between at least two endpoints. Additionally, the communication platform includes at least a second protocol. The second protocol can be used in application logic and control of the communication. The second protocol can be an asynchronous communication protocol that involves the messaging between the platform and an outside application server. The second protocol can be an application layer protocol such as HTTP, HTTPs, SPDY, and the like. The telephony application platform 110 can operate according to responses of an outside developer application. Messages sent over the second protocol preferably include communication state information. The state information can be embedded as query parameter, as message data, or in any suitable format. In some instances, the application platform 110 submits requests to the application server, and the application platform 110 will perform a service according to the response. Such a model can be common in communication-based service platforms where the service platform provides significant infrastructure to handle incoming calls. In this mode, the second protocol can be used in accessing procedural instructions generated and served by an external server. For example, in response to a call associated with an account, the telephony application platform 110 requests direction from an application server of the account. Similarly, the second protocol may be used in response to any event of the application platform 110. For example, the procedural instructions can be telephony instructions organized into a telephony instruction document. The instructions are preferably, at least partially, proceeded sequentially and translated into actions over a communication protocol (i.e., the first protocol). In another variation, an API request can be transmitted to the communication platform. The API request may be formed so as to augment and mutate communication state, which can translate into actions performed over the first protocol. For example, an application can use a REST API call to alter the state of a current voice session.

The application platform 110 acts as infrastructure delegate for a particular outside application. The application server can be hosted and operated by an outside party independent of the telephony platform. Considerable infrastructure and services are required to provide the calling services. Logistically, the complexity of a communication application platform 110 can be a barrier to allow customer access to raw metadata, logs, and/or analytics. In a first case, a given action by the application platform 110 will involve multiple resources and components of the application platform no. These resources and components can log information for internal diagnostics and tracking, but this raw data could expose the underlying infrastructure of the application platform 110, which could open up more widespread security issues. In a second case, the internal diagnostics and tracking can be useful for the application platform 110, but a significant portion of the data could be completely irrelevant to outside developers or applications. Similarly, the communication application platform 110 will log information across multiple communication protocols and resources, and the interaction of the multiple protocols (facilitated by the application platform 110) can be useful to an outside entity.

The application platform 110 will include a plurality of severs, service engines/modules, routers, processor engines, components and/or other suitable resources that are used during operating the platform. A subset of the platform resources can be publicly accessible. A public resource would be a platform resource explicitly or implicitly exposed to outside entities. Explicit exposure can include any resource directly addressable by an outside entity. An implicitly exposed resource can include resources that operate on the edge of the application platform 110 and interface with an outside entity. While an outside application may not be able to directly address communication to the implicitly exposed resource, the IP address or resource address may be visible when inspecting communication messages. A load balancer node is a common public resource that is visible by outside users. Another subset of the platform resources can be internal resources. Internal platform resources are used internally and preferably do not communicate/interact directly with outside components. While internal platform resources can be responsible for a processing or otherwise handling a task, the internal platform resource is preferably kept transparent to outside entities. The exposed platform resources and the internal platform resources preferably log events or otherwise contribute to metadata records.

The internal log storage system 120 of the preferred embodiment functions to store records of events and/or metadata of the application platform 110. The internal log storage system 120 can be any suitable metadata repository. The internal log storage system 120 stores the information for internal diagnostics and operations, but the system can additionally expose an augmented version of the data to outside entities. The internal log storage system 120 can be a single repository where all resources of the application platform 110 store metadata. More preferably, a plurality of different storage systems is used to store different types of data. The internal log storage system 120 can be database or data storage solution operated by the platform operator. Alternatively, the internal log storage system 120 can use an outside storage solution such as Amazon's S3 storage solution or any suitable storage service. In a first variation, a packet logging service is implemented within the components that handle SIP communication. Those components can run a service to store packet history (e.g., pcap "packet capture" files) in the internal log storage system 120. In a second variation, an application instruction document is processed on behalf of a user account (e.g., a developer using the platform for an outside application). As the instruction document is processed, various operations and events could be executed. Multiple services can contribute to processing the application instructions. In the telephony application platform 110 example, processing instructions could include a voice service, a SMS service, an MMS service, a SIP service, one or more media transcoding service, a text-to-speech service, and/or other suitable computing resources. The various resources of the platform can store metadata records into one or more internal log storage systems 120. In a third variation, the application platform 110 can provide a number of accessible API resources. A subset of the API resources can be used to invoke different actions and behavior by the platform. Calls made to the API resources that either query the API or mutate the API resource can be logged along with responses to API calls. Another subset of the API resources can be accessed to retrieve media and/or information about a particular item. For example, the telephony application platform 110 can include a call resource where information about a call such as origin phone number, destination phone number, and call duration can be accessed. Resource data generated or captured by the application platform 110 can be stored in an internal log storage system 120. The information can be stored in a raw form and sanitized on demand.

The log sanitizer 130 of the preferred embodiment functions to process and clean metadata of the internal log storage system 120 for outside consumption. The raw metadata and the information contained in the stored records can include several components that could be unsuitable for sharing with the users of a multitenant platform 110. Some exemplary metadata information that could be sensitive information can include IP addresses or other endpoint addresses of internal platform resources, internal signaling of internal platform resources, communication flow protocol between multiple platform resources, sensitive user information, proprietary data or information valuable to the platform, internal errors or warnings, partner information, and/or any suitable logged information that a platform operator (or user of the platform) would have reason to keep unexposed. The log sanitizer 130 preferably abstracts the log information to level where only desired information is exposed. In one variation, the amount and type of information sanitized can be dynamically set according to a policy engine. The policy engine preferably uses a request account to determine the level of sanitization.

The log sanitizer 130 can use a variety of different processes during the sanitization process. In a first process, internal resources are generalized to a parent or related public resource. During a communication session, a public resource will interface between an outside entity and the internal platform resources. As opposed to attributing the different events to the responsible internal platform resources, the logged events can be attributed to the public resource. From the perspective of the outside application, a single public resource is responsible for all the events. During packet logging, the IPs of internal platform resources are replaced with an IP of a public resource. The log sanitizer 130 can additionally recalculate any checksums or reprocess other aspects of the packet when updated with a sanitized IP address. The log sanitizer 130 can additionally filter events. All or select events of internal platform resources can be removed, condensed, or summarized to simplify the metadata provided to outside users. Similarly, some events may be reduced to simplified representations. For example, in a telephony application platform 110, it could be beneficial to show that different network carriers were contacted when initiating a new call. However, it could be detrimental to reveal the actual carriers used and any prioritization of those carriers. In this situation, the log sanitizer 130 can anonymize the carrier names and details (e.g., SIP addresses, IP addresses and the like). The log sanitizer 130 can additionally use log patterns across accounts, session instances, requests, or other instances of platform use. For example, the log sanitizer 130 can identify application instruction logic errors based on recurring patterns in multiple events. The system can additionally include a cache of sanitized metadata such that repeated requests do not require raw data to be re-sanitized a subsequent time. The log sanitizer 130 preferably includes interfaces to the internal log storage system 120 and to at least one outside interface. The interface can be to a web stack, which can use the data to provide a graphical user interface, or to an exposed API such that programmatic interaction with the information can occur.

In the first exemplary implementation, the SIP pcap information is sanitized, cleaned, organized, or otherwise augmented to remove references to internal platform resources and to generalize platform actions to the public platform resources. Additionally, some internal routing can be removed from the pcap information logs, which functions to abstract internal operations of the application platform 110 to those impacting outside applications. In the second exemplary implementation, processing of instructions is sanitized to anonymize or remove references to internal and protected outside resources (e.g., partner resources).

The exposed log interface 140 of the preferred embodiment functions to provide an access layer to sanitized log information. The exposed log interface 140 is used by outside account holders and/or applications to access or read metadata. The metadata is preferably stored in reference to historical use of the application platform 110. The metadata can be grouped or associated with particular sessions of use. The exposed log interface 140 can enable an entity to access metadata of a particular account, accounts, sub-accounts or sub-accounts, and optionally to specify a particular sub-set of metadata to be accessed. In a first variation, the exposed log interface 140 is a graphical user interface. A web stack or native application uses a private or non-public API to communicate with the log sanitizer 130 to request a particular set of logged metadata. The log sanitizer 130 can sanitize the requested data on-demand and then transmit the information to the web stack or native application. The web stack or native application can then transform the sanitized metadata into a graphical user interface. In another variation, an API can be exposed by the application platform 110 such that the information can be programmatically retrieved. The API is preferably a REST API, but any suitable type of API can alternatively be used.

The log interface 140 in one variation includes a set of graphical user interface component, which function to facilitate understanding and utility of log information when viewed by a user.

As a first component, a graphical log interface 140 can include a browsing interface, which functions to provide a mechanism through which a user can explore log information available to an account. In one variation, the log information is a time ordered list of event logs. More preferably, the log information is partitioned or segmented into different portions that represent different sessions as shown in FIG. 4. For example, all event logs associated with a particular communication session can be grouped together. In one case, multiple communication sessions are executed in parallel, and each of the sessions can be segmented into individual information sequence logs so that the sequence of events can be more easily followed. The browsing interface can additionally include a classification of log information segments. In particular, sequences with errors are classified and highlighted for inspection. The type of error and different error patterns can be classified. The user can explore different error classifications to see a collection of log information sessions that include or relate to the error. In one variation, errors of higher priority or that have been classified as solvable may highlighted above other errors. Additionally or alternatively, the browsing interface can include a search tool. The log information is preferably indexed based on the properties used in the communication. The indexed log information can be searched using any suitable search interface. In one example, a user can search for log information be defining a search query based on packet parameters.

As a second component, the log information is formatted into a unified event log interface as shown in FIGS. 4, 8A, 8B, 9A, and 9B. The unified event log interface preferably includes a sequenced combination of at least two protocols. As described, a first protocol may be a SIP protocol and the second protocol may be an HTTP-based protocol (HTTP or HTTPS). The unified event log interface is a combination of at least two forms log information with the sequence set based on timing and/or cause and effect. For example, the unified event log interface may show an API request to initiate a call, the SIP communication in negotiating the call, the HTTP communication between the application platform 110 and an outside server when obtaining procedural instructions, and then the resulting updates to the SIP communication.

The unified event log interface can additionally include error or event annotations. The annotations can be used to add descriptive markers for portions of the event logs. A set of individual log records may be summarized as performing some actions. For example, the SIP sequence of communications related to calling a number may have an annotation of "calling phone number". Errors may additionally include annotations that add a description of the error. In one variation, the error annotation can include a suggestion for a solution.

As another component, the log interface 140 can include shared log browsing mode, wherein two graphical log interfaces are synchronized between two device instances. The shared log browsing mode is preferably used as a tool for customer support agents aiding a customer. The shared browsing mode can include a first account view of log information and a second account view of log information. Preferably, one account can have greater permissions or access to log information, while a second account has a restricted view of the log information (i.e., the log information is more heavily sanitized). In one use case scenario, a customer can call customer support, and the log information viewed by the customer can be synchronized with the customer support. However, the customer sees a sanitized view of the log information while the customer support views log information from the same session but with the log information sanitized in a different format or with no sanitization at all. In one variation, actions made through one device instance can be synchronized by a second instance.

As another component, the log interface 140 can include an event replay tool, which functions to enable one or more event sequences to be replayed. The event replay tool can enable different requests originating from the application platform 110 to be executed. The outbound message is preferably transmitted to the same destination in substantially the same manner. Some parameters may be edited or changed during replay. The replayed communication can result in a response. The response may be compared to the original response with differences highlighted for easy comparison. In one variation, each step in a sequence of communications has to be individually initiated. In another variation, a user can individually step through a sequence. Alternatively, a sequence of communications can be replayed at any suitable time.

2. Method for Providing Sanitized Platform Metadata

Figure 5:
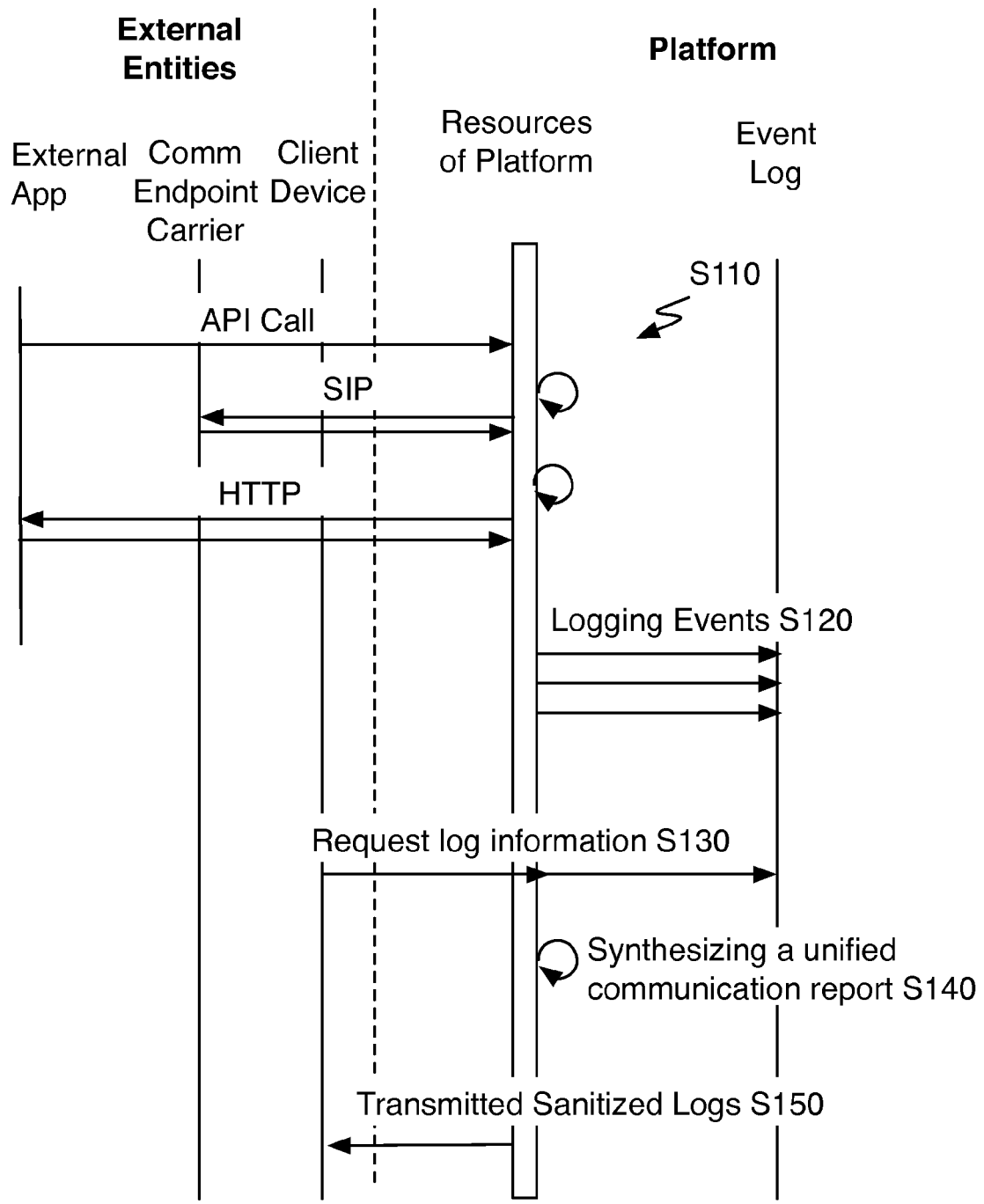
FIG. 5 is a communication flow diagram of a method of a preferred embodiment.

As shown in FIG. 5, a method for providing sanitized platform metadata of a preferred embodiment can include executing an application platform utilizing a set of protocols S110, capturing internal log information during execution of the application platform S120, receiving a request to access log information by an outside entity S130, synthesizing the internal log information of the set of protocols into a unified communication report S140, and transmitting the unified communication report S150. The method functions to expose a useful interpretation of account logs in a communication application platform that has been delegated communication responsibility by an outside party. Preferably, the unified communication report is used in creating a unified log visualization that makes sense of communication signaling of a first protocol and the related log events of application logic of a second protocol. In one variation, the first protocol is a media signaling protocol such as SIP and the second protocol is an application layer protocol and more specifically an HTTP based protocol employed in obtaining application directives.

Figure 6:
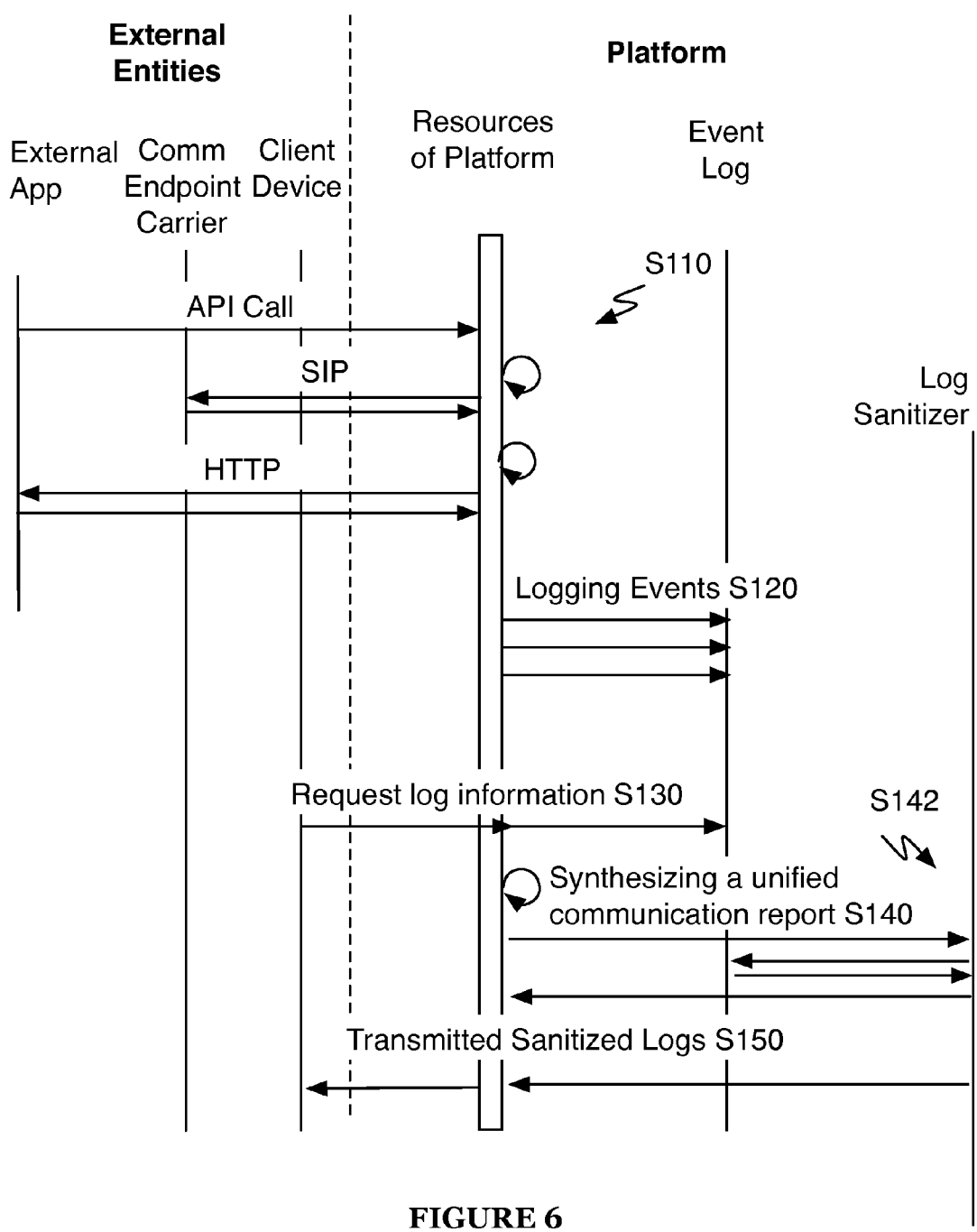
FIG. 6 is a communication flow diagram of a variation of a preferred embodiment.

In one variation, synthesizing the internal log information can include sanitizing the log information S142 as shown in FIG. 6, wherein the method can function to share internal log information of an application platform while preserving confidential or internal information of the platform. An application platform can generate considerable log and eventing records to support execution of the platform, platform analytics, and issue resolution. The method enables the information to be reformatted and selectively formatted to provide relevant data and uncompromising data. A first potential benefit of the method is the automatic privatization of internal information of full event information. A second potential benefit of the method is the automatic simplification of log information. If all internally logged information were exposed, the data could be rendered unusable by outside entities because of the large barrier to interpreting and processing the information into a usable form. The method can simplify, reduce, and interpret log records into a more consumable format for outside entities.

The method can have particular benefits for session logs or a set of interconnected or related records. For example, the method can be applied to packet-based record synthesis and sanitation such as the data generated during a SIP communication session or other synchronous communication session. The method can similarly be used in platforms with instruction interpretation where a sequence of processes is initiated in response to interpretation and execution of an instruction document (e.g., an XML document of telephony instructions). The logged information can be exposed over a user graphical interface or alternatively through an API of the application platform. In particular, the method has benefits in the area of telephony or communication application platforms, where the application platform includes extensive infrastructure to support the service provided to outside customers (e.g., developers and their respective applications). An outside developer may delegate complicated communication processes of his application to the communication application platform, and because many of the processes involve internal infrastructure, the method can facilitate exposing at least some of the internal logs in a safe and controlled manner.

Block S110, which includes executing an application platform utilizing a set of protocols, functions to run, host, or manage an application platform. The application platform is preferably a platform-as-a-service (PaaS) type infrastructure that provides processing, resources, or services to outside entities. The outside entities are preferably account holders but could alternatively be any suitable outside entity. Developers and managers of applications configure their respective applications to use the application platform to facilitate at least a portion of the application offering. The application platform is preferably a multitenant platform, servicing multiple accounts on shared resources. The application platform can additionally enable forming hierarchical multitenancy such that accounts of the application platform can similarly have subaccounts wherein the parent account seemingly provides multitenancy. A subaccount or a basic account may both be suitable outside entities. The logged information of the method is preferably logged for multiple accounts if not all accounts, but the method can similarly be applied to non-multitenant platforms or to individual accounts.

When executing an application platform on behalf of an outside entity, executing the application platform can include several different types of operations. These operations can be dependent on the objective and function of the particular application platform. One preferred type of application platform is a telephony or communication application platform as described and referenced above. Various use-cases of the method for a communication platform are used herein. However, the method is not limited to such use cases and can be applied to any suitable platform.

In one exemplary mode, executing an application platform can include routing a communication session through at least two resources of the application platform. When an application platform is facilitating communication with one endpoint or between two or more endpoints, the application platform can depend on multiple resources to provide a service. This may involve routing between two resources that each connects to a different endpoint. For example, a caller in a first region may connect to a local resource in the first region. The application platform then routes communication through different resources to a resource in a second region to connect to a call destination endpoint. In another example, an outside entity connects to a public resource of the platform, and then one or more internal resources actually processes the requested task before public resource responds to the outside entity. Such communication routing, negotiating, and orchestration can be at least partially achieved through a media signaling protocol. The media signaling protocol is preferably SIP but may alternatively be any suitable protocol. Log information related to the SIP packet traffic that passes within the platform and on the edge of the network (inbound and outbound Sip traffic) may be logged events. For example, logged information of the SIP traffic may show the INVITE request of a caller, the trying response to the caller, an INVITE to a first destination, the Ringing messages, the acceptance message, the acknowledgement message, and the session progress message, and a BYE message. The logged information can include any suitable SIP message. A communication signaling protocol of the application platform preferably bridges and coordinates media flow between at least two endpoints.

In a related mode, executing an application platform can additionally include processing application logic of a communication session, which functions to perform delegated business logic of an outside entity. Processing application logic can include obtaining, interpreting, and executing instructions. In one variation, an application layer protocol is used in retrieving or receiving application instructions. The application layer protocol is preferably an HTTP-based protocol such as HTTP or HTTPS, but may alternatively be any suitable application layer protocol such as SPDY. In one variation, an event callback URI is configured for an application or an account. The application platform makes a request to the event callback URI using the application layer protocol upon detection of the event. A response to the request preferably includes procedural instructions. The procedural instructions can be telephony instructions that may direct a communication-focused application platform to call a number, message a number (e.g., SMS, MMS), make a video call, start a recording, collect input (e.g., DTMF), play audio generated from text (e.g., text-to-speech), play an audio file, put the communication session in a queue, join a conference, redirect the call, hang-up, or any suitable action. The telephony instruction retrieval can preferably occur upon initiating or redirecting communication session control as in the system described in U.S. Pat. No. 8,306,021 filed 6 Nov. 2012, which is hereby incorporated in its entirety by this reference. The procedural instructions are preferably contained within a document and more preferably formatted in a markup language document. The procedural instructions are preferably at least partially processed sequentially. The procedural instruction documents are preferably retrieved synchronous to the transactions of a communication session. For example, a call may be received resulting in SIP events; the application platform then retrieves procedural instructions using HTTP, processing the logs results in inviting another endpoint over SIP; and the next instruction then redirects application control to another URI in response to some user input (e.g., a DTMF key). The retrieval of procedural instruction documents can have an at least partially synchronous order with the SIP events.

The processing of application logic can additionally include the processing of application programming interface communication directives. API requests of outside entities may additionally or alternatively be used in affecting the business logic of a communication session. The API requests are preferably received asynchronous to other events. In other words, an API call may be received which causes a call to be ended in the middle of its session. The API is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein HTTP-based protocol is described, but it should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. Accessing of these resources can be logged and any mutation of the resource can similarly be logged. In some cases, mutating an API resource can alter the processing of one or more communication session. Additionally application layer protocol communication may additionally be used internally in directing media handling.

Processing application instructions can similarly involve multiple internal computing resources. It can be desirable to keep the architecture of the internal resources secret or unexposed. The internal resource addresses, the communication and networking protocols, the number of resource instances, the location and distribution of resources, the software or hardware of the resources, errors or warnings of internal resources, and/or other aspects can all be considered confidential or private. An operator of an application platform can want to keep the information private for privacy issues, security issues, operational advantage issues, or for any suitable reason. In one variation, the application instructions are executed sequentially, and the various involved resources log events and communications as individual instructions are executed. Internally this creates a raw log of actions and reactions when executing the application instructions. This can be useful for debugging, optimizing, or otherwise reviewing execution of a set of instructions. The method can provide a sanitized version of such debugging information while preserving sensitive information. Additionally, the application instructions may be reused in part or whole in additional application instances (e.g., executing the application for different users). The method can be used to interpret and understand events across multiple instances of application instructions.

In other various types of application platforms, executing an application platform can include transforming media, hosting resources or services, or any suitable operation. The different resources involved in a communication session (e.g., those involved in the communication signaling and application logic related communication) can contribute to log information in block S120.

Block S120, which includes capturing internal log information during execution of the application platform, functions to record events, packet records, resource configuration, API resource metadata, and other raw internal operational information of the application platform. Capturing log information can include a resource communicating log information and storing the log information in a log storage system. During execution of the application platform in Block S110, the various services and resources can log individual operational information. For example, a resource can submit a log for each request received from another resource and/or response transmitted from the resource. When executing a communication session, involved resources can record signaling packets used to direct and control the media stream of the communication session. For example, during a SIP-based communication session, a public node (e.g., a load balancer) can capture all packets from the network and sort each call into a pcap record. The pcap records are then stored in a hosted storage system (e.g., Amazon S3). The network packet records can be stored in any suitable format. When interpreting and executing instructions, resources perform actions on behalf of a request or communication session. The resources can record their actions, status, and other suitable metadata when facilitating execution of the instruction. The metadata is preferably logged in association with a responsible request identifier. In one variation, the request identifier can be a communication or call identifier. In another variation, the request identifier can be a timestamp and account identifier. The request identifier can be used to link or associate a sequence or set of log information.

Block S130, which includes receiving a request to access log information by an outside entity, functions to have an outside party use an established mechanism to access a form of the log information. The outside entity is preferably an account or sub-account holder. The request can be issued programmatically by an outside application using a provided set of API calls. The request can alternatively be initiated due to interaction of an account holder or administrator. In one variation, a graphical user interface is provided that an account holder can use to access and review log information. A web stack that manages interfacing with browser clients can be configured to use an API (e.g., private or public API) to contact a log processing service to provide access to a unified public version of the log information. In an alternative implementation, an outside application or service can programmatically request log information. A RESTful API can be used to access unified and optionally sanitized log information, but the API may alternatively be any suitable API such as SOAP. A request to access log information may be a query for a particular type of log information. Alternatively, the request may be a default request wherein the most recent log information or some predefined type of log information is requested.

Block S140, which includes synthesizing the internal log information of the set of protocols into a unified communication report, functions to process the raw log information into a version to expose externally. The unified communication report preferably synthesizes the internal log information of a first protocol and at least a second protocol. The first and second protocol can be substantially independent protocols by design. However, the application platform directs use of at least two protocols in an inter-connected manner, wherein cause and effect of errors or transactions can be traced between the two protocols. In a preferred implementation, the two protocols can be SIP for media signaling and HTTP-based protocol for application logic control. The method can similarly be applied to an application platform that uses more than two protocols. For example, the unified communication report may collect the inter-related communication logs for three or more protocols. For example, a call from a SIP phone bridged to a proprietary voice over IP protocol and controlled by instructions retrieved from an application server may have events from three different protocols reflected in the unified communication report.

Synthesizing the internal log information into a unified communication report can include collating log information across a collection of log information, which functions to collect and organize the log information. The collection is preferably log information of at least two platform used protocols. The collection also defines a set of log information, which can be interpreted as a block. Preferably, a collection is the set of log information related to a single communication session. For example, the SIP packets and HTTP requests/responses issued for a single phone call would be included in the collection. Forming a selection can include partitioning log information according to collection definition. In the communication session example, a call session identifier property may be used to identify all log information with the same call session identifier. A collection could alternatively be all communication sessions involving a particular endpoint, all log information for a sub-account, all log information for a particular day, or any suitable collection. In partitioning log information, the time stamp of a log record may be ignored such that log records in sequential order may not be part of the same collection. For example, two communication sessions may generate log records with overlapping and intermingled events, but partitioning functions to split the log records into two collections. The type of collection may additionally change depending on the request or requirements. For example, a log reporting interface may allow a customer to screen individual communication sessions for different types of errors in a given session, but the log reporting interface may additionally screen log information for warnings about repeated calls which may use collections of events for a given caller, which may allow an administrator to observe how customers perform repeated communications.

Synthesizing the internal log information into a unified communication report can additionally include sequencing can include assigning event dependence order, which functions to order the log events. The log events are preferably organized to reflect causality of events. In one variation, ordering the log events within a collection by time will achieve a sequenced order. However, in some instances, the exact time order may not be of as much significance as the causality order. If a first SIP message is received which results in an HTTP request, those two messages are preferably represented in the unified communication report as sequentially ordered. In this example, even if an API event was triggered in between the SIP and HTTP request, the time order of these three events may be broken, placing the API event. Different ordering rules may be made. Similarly, events may be removed or curated to show the most meaningful events. Additionally, the log information may be sanitized as in block S142.

Figure 7:
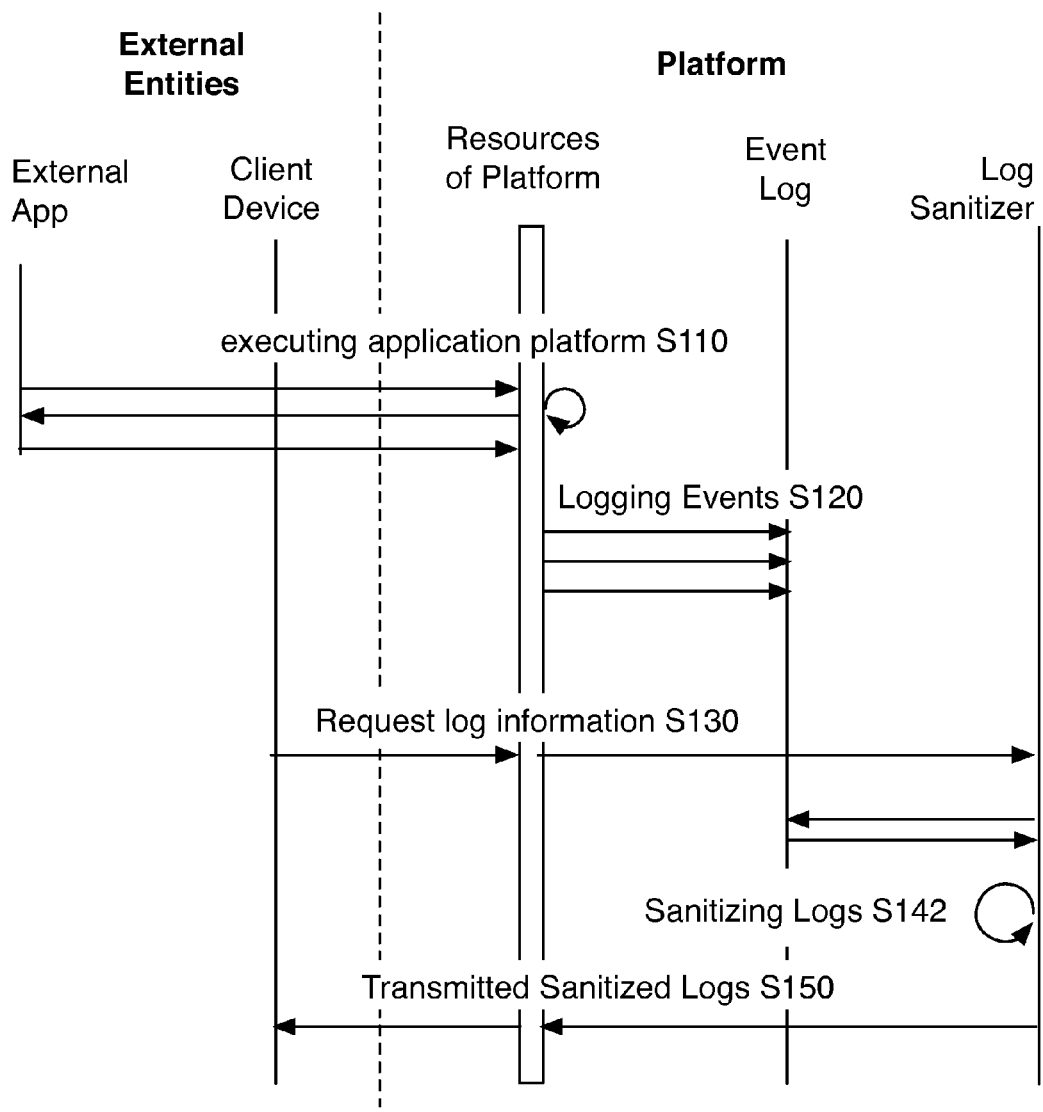
FIG. 7 is a communication flow diagram of a method of an alternative preferred embodiment.

Additionally or alternatively, the method can include Block S142, which includes sanitizing the log information, functions to store log information for consumption by outside parties. The log information is manipulated, processed, and otherwise altered to remove private information, simplify or abstract internal processes, and selectively filter information. Sanitizing log information is preferably performed at a sanitizing service. The sanitization of log information is preferably responsive to outside requests such that information is sanitized on demand. The log information can alternatively be sanitized preemptively wherein the collected log information is sanitized during ingestion. In one alternative embodiment, the sanitization may be employed independent of collating and sequencing log events of multiple protocols as shown in FIG. 7. The sanitization may be applied to log information of any type. Sanitized information can additionally be cached for repeated requests. Access to log information can additionally be predicted through a suitable learning algorithm or pattern detection, and the predicted log information can be sanitized based on historical patterns. For example, an account that routinely accesses daily log information of a particular type can be pre-processed.

Sanitizing log information can include various processes to augment raw internal log information for outside consumption. In one process, sanitizing log information can include generating artificial log records with altered metadata. In one variation, resource identifiers are replaced with fake resources, public resources, or other suitable replacement identifiers, which functions to anonymize resources. Generating artificial log records can be applied to internal resources, outside partner resources, and/or participants of the logged event. Generating artificial log records may be achieved by abstracting communication of multiple internal resources of the platform to a single proxy resource. The proxy resource is a stand-in or placeholder representation that hides complexity of events that occur internal to that proxy resource. The proxy resource may be real resource or a generated representation of a resource. In one implementation, public resources can be used as stand-ins for internal resources, which functions to turn the application platform to a logged black box where events and information is attributed to one or more public resources. This can function to create an artificial simplification of what resource of the application platform is performing an action. From the perspective of an outside application, the application will connect with a first public resource (i.e., the proxy resource) of the platform, and all the associated events and metadata related to that connection are attributed to the public resource. In the original log information, the original raw logs would indicate the underlying internal resources that performed the various actions. When a set of log information is related through an identifier (e.g., a communication session identifier), externally exposed resources (i.e., resources communicating outside of the application platform) are used in place of internal resources. For example, the IP address of a public node can be used for internal resources facilitating a route. In pcap based sanitation, this can additionally include recalculating checksums of packets such that the sanitized packets appear legitimate. Similarly, partner resources can be anonymized. For example, a communication platform may use outside resources such as a set of different network carriers. Instead of exposing the set of network carriers and possibly their respective private address information, the method can include using generic or fake identifiers for sensitive information.

Other aspects can similarly be transformed to protect internal operation and data. For example, if log information because of its structure reveals a service, protocol, or other tool used, the records can be reformatted to a generic format or syntax to anonymize internal practices. In some cases, instead of replacing information with dummy information, sensitive log information can be generalized, categorized, or otherwise represented in an alternative form, which provides informational insight. For example, a particular piece of metadata could include detailed location information, user-identifiable metadata, or any specific information. The sanitizer can categorize exact information to a broader description. The location information can be transformed to regionally specific information (e.g., city information instead of latitude and longitude), and user information can be generalized into a generic descriptor of the user.

Sanitizing log information can additionally or alternatively include condensing log information, which functions to simplify logged information. Multiple records can be condensed or simplified into a single event record when returned to an outside entity. In some instances, considerably more log information may be kept by a platform than would be of interest to outside entities. For example, when a service is establishing communication through some communication channel, an outside entity may only be interested in the attempt to communicate and the result of that attempt (e.g., success, redirection, failure, etc.), while internal logs include requests, acknowledgements, handshaking, and other portions of the event. By abstracting the log information into a high-level summary, the public version of the log information can be more consumable by outside entities. Condensing log information can additionally function as a form of event folding showing different abstraction layers of information. Additionally condensing log information can include processing log information across multiple instances of an application, session, or other usage instance. Patterns across multiple instances can be modeled and interpreted into a simplified representation. For example, some errors may be evident when viewed across multiple communication sessions on a communication platform. Multiple communication sessions can be processed to identify the error.

In one variation, the level of sanitization is determined by a policy engine. Policy can preferably be set based on the requesting account. For example, an account with platform administrator privileges (such as a customer support agent) may be able to control the level of sanitization occurring on the log information. For example, a customer support agent may be able to toggle between a raw log information view of a unified communication report and a sanitized and simplified version viewed by a customer. A customer account may view a sanitized unified communication report. A sub-account of the customer may have access to a view even further simplified and sanitized. For example, a resource of the customer account may be sanitized in the report viewed by the sub-account.

Figure 8A:
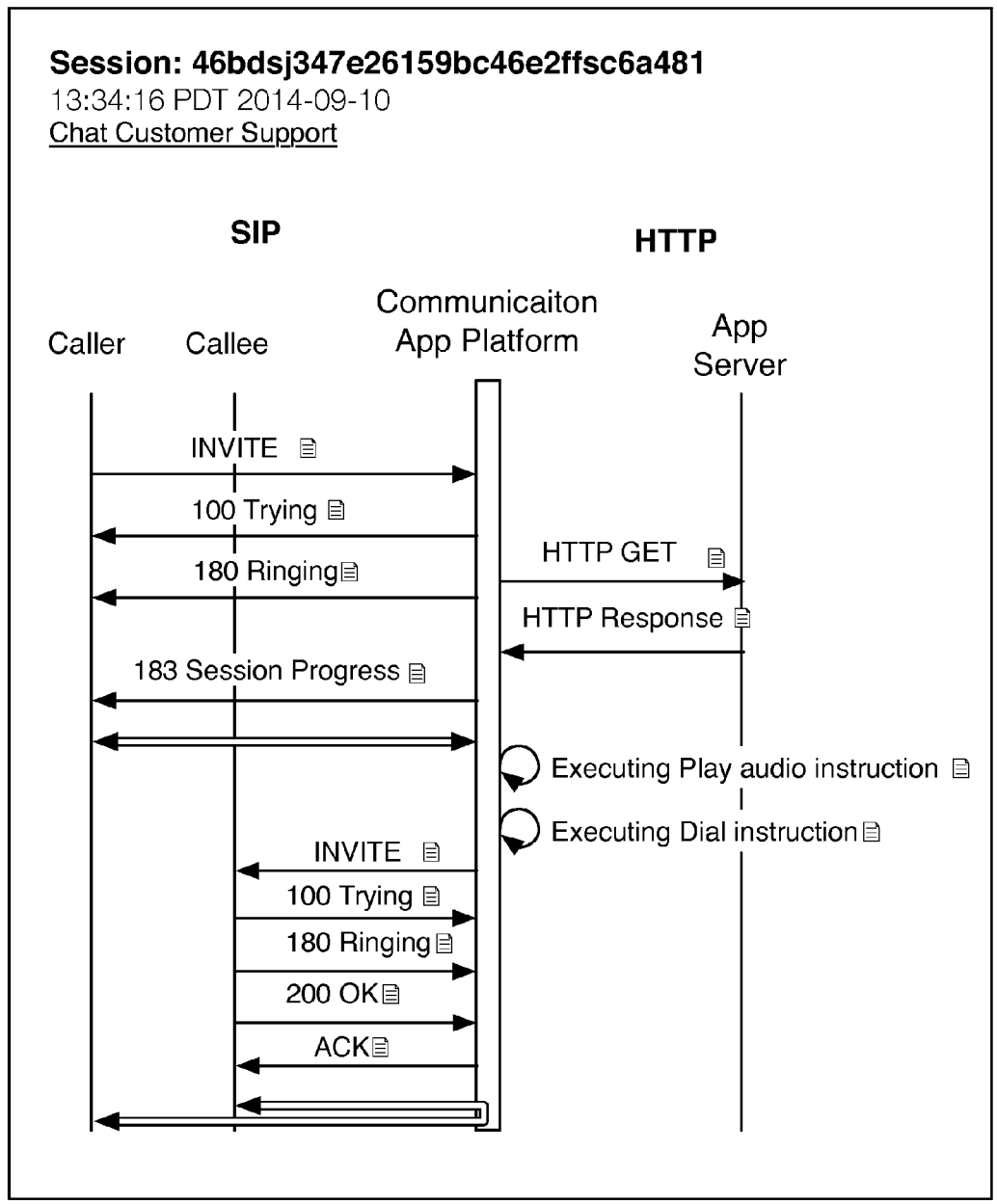
FIGS. 8A and 8B is an exemplary representation of a unified log report interface.
Figure 8B:
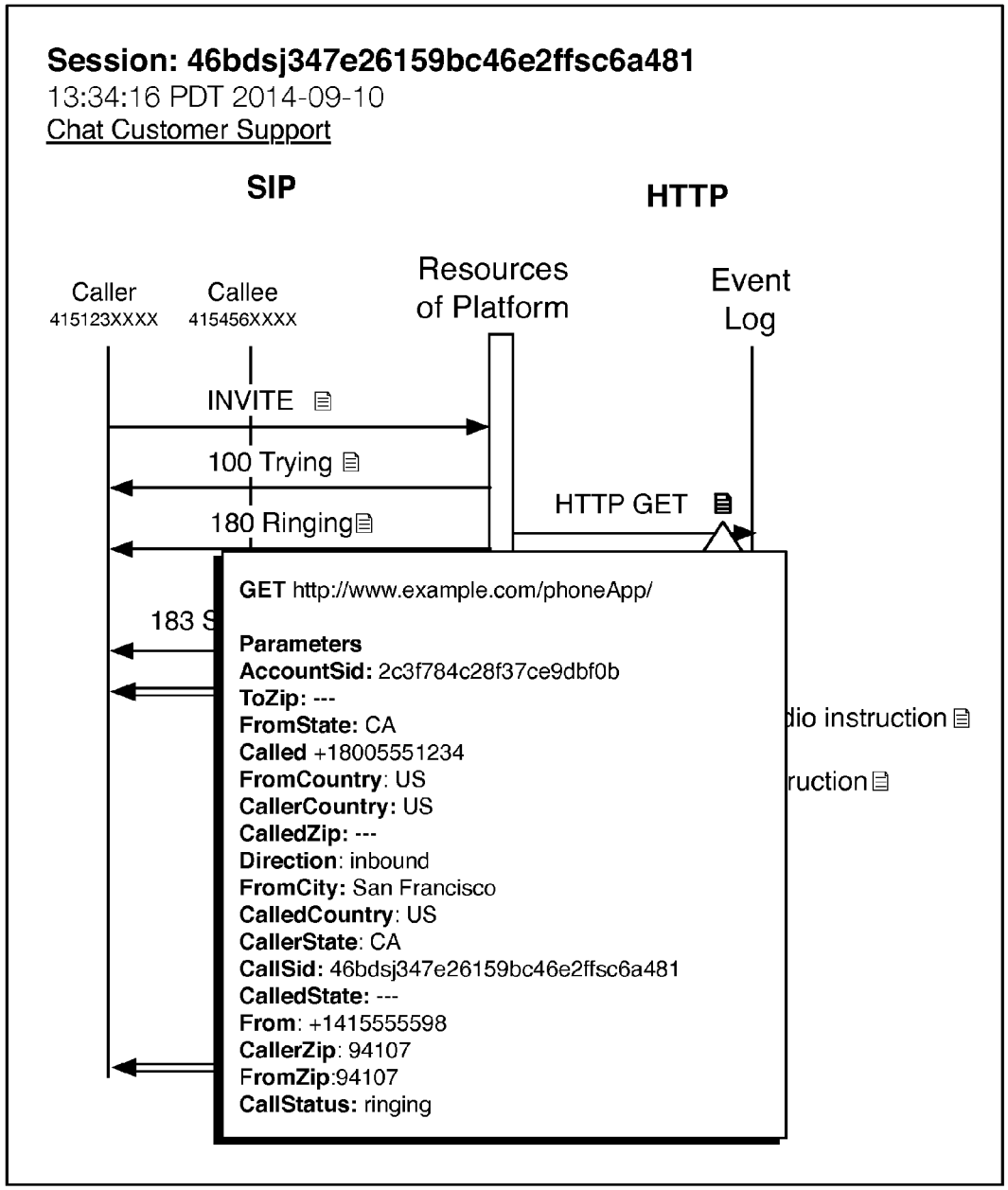
Figure 9B:
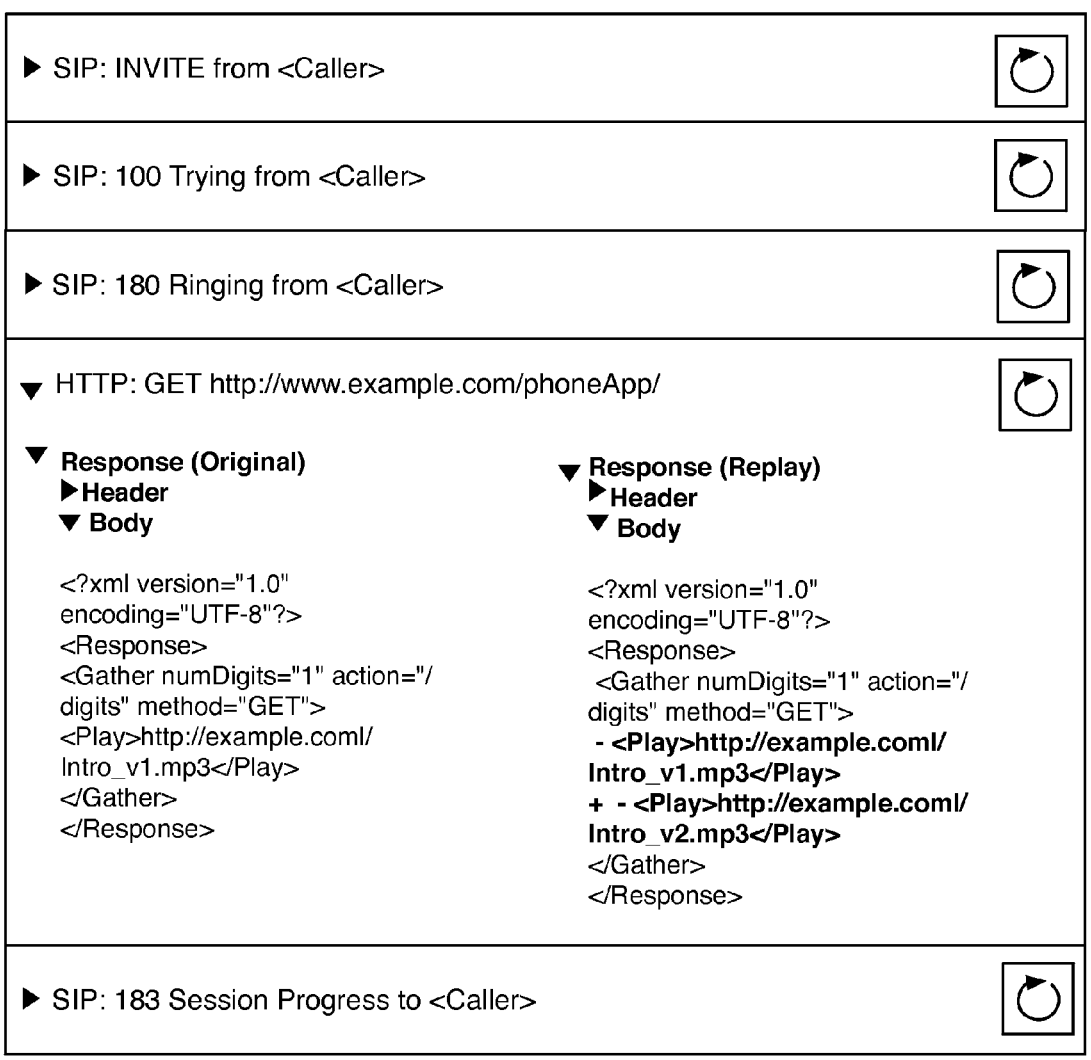

Block S150, which includes transmitting the unified log report, functions to respond to a request with log information augmented for outside use. The unified log report can be transmitted as a reply to the request. The transmitted log report may alternatively be delivered or made accessible in an alternative endpoint. For example, a request may prompt the generation of the log report, but the log report may be made accessible in a second location after the log information is sanitized. As described elsewhere, the sanitized log information can be pre-processed and automatically organized into info graphics or pre-organized data, but the log information may alternatively be returned in a data serialization format for handling and processing by the outside entity. In one variation, the unified log report is returned in a programmatic format such as in response to an API call or application instruction. In another variation, the log report is communicated to a destination endpoint. For example, the log report may be automatically delivered to a service health email address, which can be configured by the account manager. The unified log report may be embedded in the communication. Alternatively, a URL may be included to the related log report or reports. In a third variation, the unified log report is converted into rendered user interface element. The unified log report interface element may be static, but the report interface is more preferably interactive. In one variation, the unified log report is a communication sequence diagram representing the sequential transfer of information and actions between different resources as shown in FIGS. 8A and 8B. As shown in FIG. 8B, the details of different logged records can preferably be inspected. In another variation, the unified log report can be a listed transcription of event records as shown in FIGS. 9A and 9B. As described below, the report interface may include replaying the events, sharing the report with a customer-service agent, finding similar log report occurrences, exploring error resolutions, debugging applications, or any suitable use.

Figure 10:
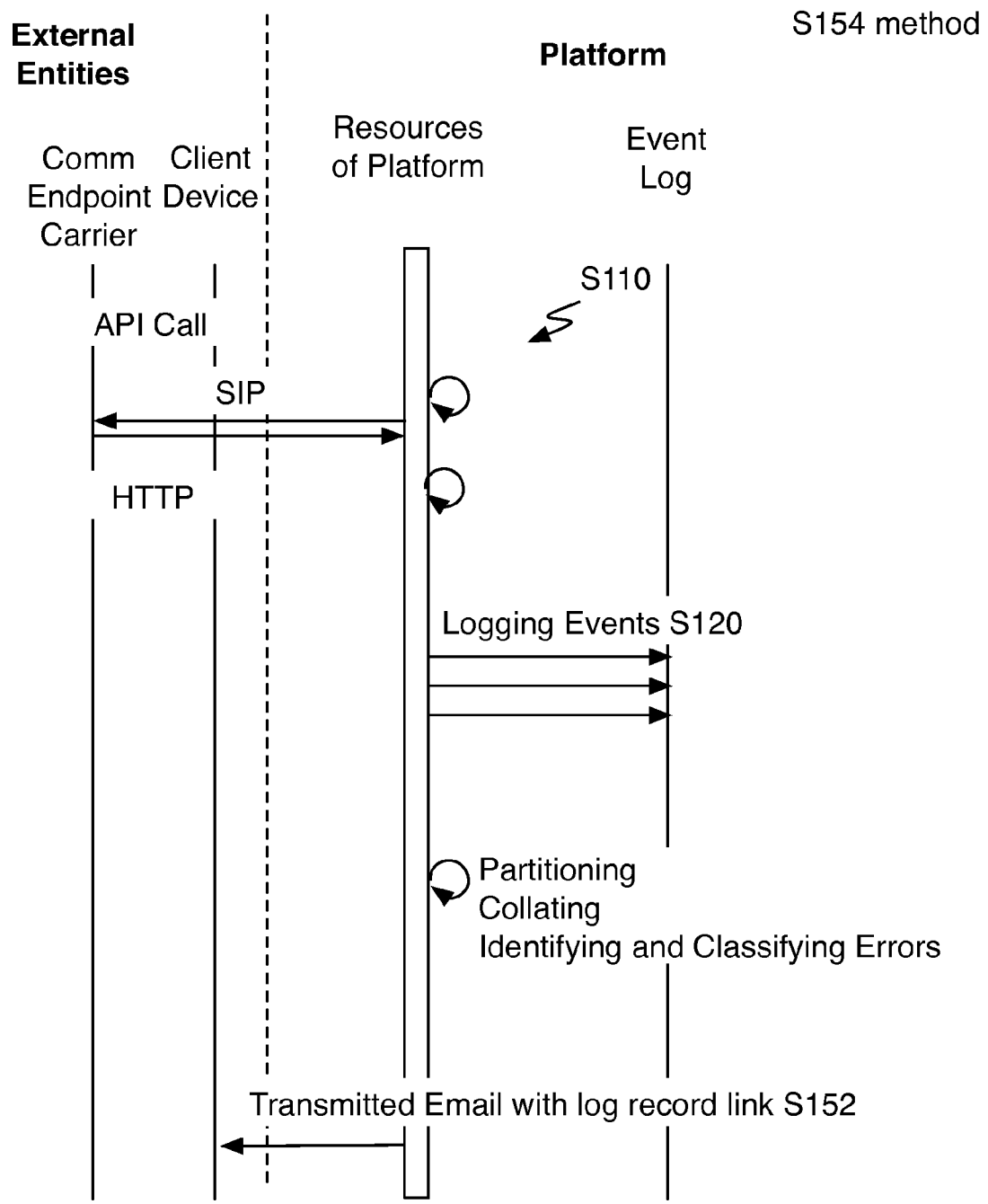
FIG. 10 is a communication flow diagram of a variation of transmitting a communication.

The method can additionally include transmitting a communication to a configured destination S152, which functions to notify an interested party of events. Transmitting a communication can include sending an email, sending an HTTP message with log data to a callback URI, sending a text notification, or sending a communication to any suitable type of endpoint. In one variation, a log report summary may be sent in the communication on a periodic basis (e.g., hourly, daily, weekly, etc.). In another variation, the communication can be responsive to an event, and the communication can include one or more specific log reports as shown in FIG. 10. For example, a log report associated with an error can be sent when the error is encountered. Transmitting a communication can include embedding a link to a unified communication report. The communication may alternatively include a data representation of the unified communication report.

Preferably, a log report interface will include navigation tools to find, explore, and access log reports of different collections. In one implementation, the log report interface will include a time ordered list of relevant log reports. In one variation, the log reports may be filtered based on different characteristics as shown in FIG. 4. There could be an "all" category showing log reports for all calls. There could be an "error" category or categories for different error types such as "application timeout", "communication error" or any suitable type of error. There could be a warning category for log information that didn't encounter an error but have been flagged. For example, communications that had low media quality, short duration (e.g., <1 second), long duration (e.g., longer than an hour), slow application server responses, long duration of silence, and other occurrences, which warrant being notified of.

In one variation, the log report interface includes a searching tool. Accordingly, the method can include indexing properties of the log information S160, which functions to allow search queries to be made using various properties of the individual log records. Once indexed, a request to access log information may provide different search query parameters that define the results of the query. The search is preferably completed using the indexed log information and then the results are returned in a suitable format. For example, a user can use the log report interface to search for all log reports that included an instruction to play the mp3 file test.mp3. Events that satisfy this query can be identified and then the appropriate log reports formed. In the user interface, the search results may prevent a summary description of the log such as the time and associated endpoints. The search results may additionally show a preview of the log report.

In one particular use case, the log report interface is used in conveying errors encountered by the system. Accordingly, the method can include detecting an error and classifying the error in a unified communication report. In one variation, the error is an event that is logged during execution of the application platform. Error classification may be based on error codes. Additionally, error classification may process the actual events in a collection and generate a summary of the error. For example, an error may be encountered at one point in a sequence of events, but there may be a subset of events that may be involved in resulting in the error. The log report interface may highlight the involved events in the unified log report as an annotation. The event classification can similarly be used in making the log reports more navigable. For example, the method may classify errors based on which ones are solvable. Solvable errors may be of interest to an account holder because they may be easily avoided. Unified log report classification can additionally allow similar collections to be grouped. In one variation, event sequences within individual log reports are analyzed and related to log reports with substantially similar sequence patterns. These event sequence patterns may be predefined. For example, conference call event patterns, phone tree event pattern, and other common event log patterns may be predefined so that these categories can be easily accessed by a customer. Alternatively, the event sequence patterns are automatically processed. Any suitable approach to event sequence pattern comparison may be used. As one simple approach, similar log reports may be identified by identifying other log reports where the communication session is controlled by the same application server URI. Identifying similar log reports can be used to show similar log reports for a given log report, which functions to provide a simple interface for a customer account to compare the differences between different scenarios.

Figure 11:
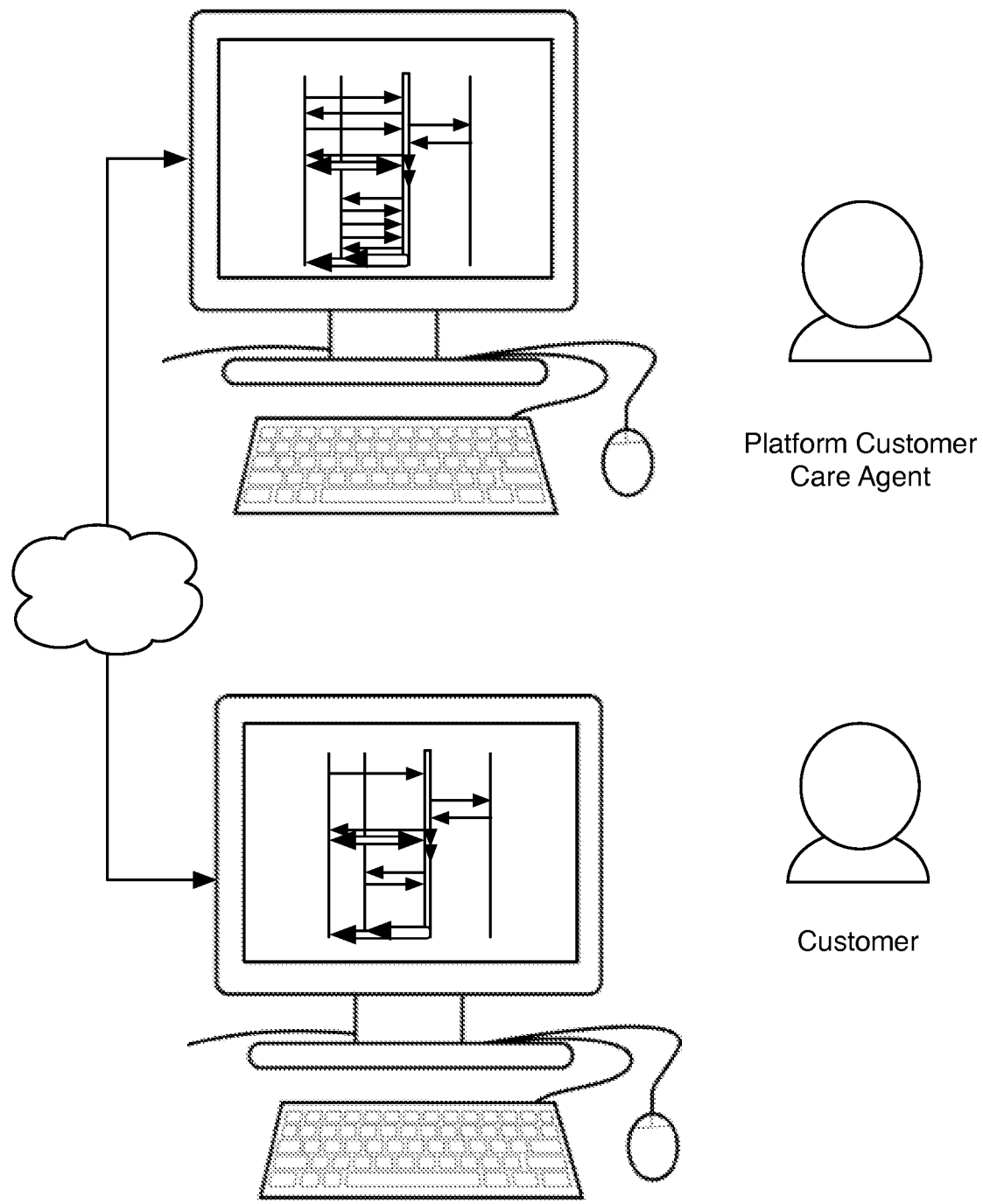
FIG. 11 is a schematic representation of synchronizing two log report interfaces.
Figure 12:
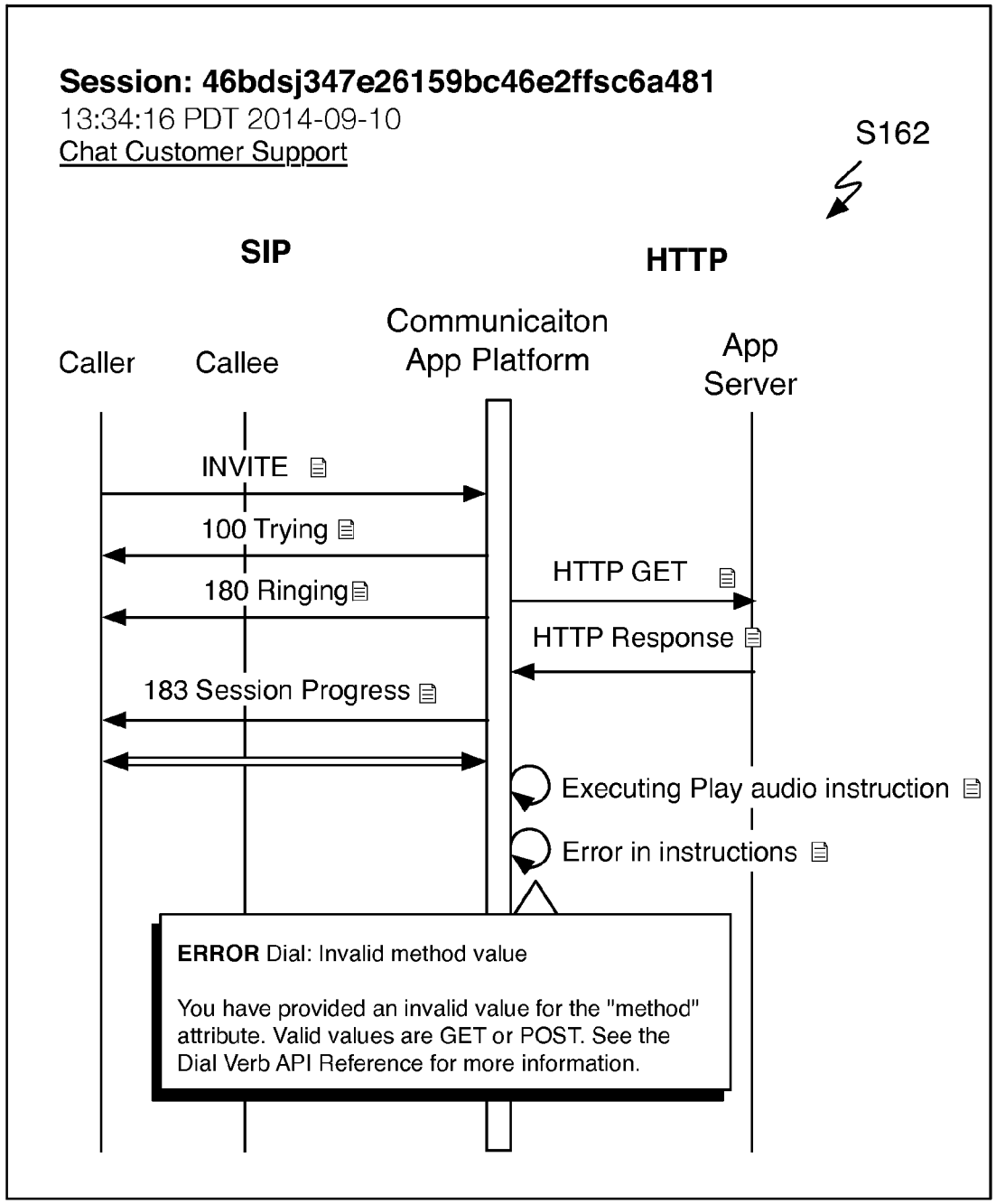
FIG. 12 is a schematic representation of annotating a log report.

The method can additionally include annotating a unified log report S162 as shown in FIG. 12. The annotations can be informational markup, which can be conveyed in an API response. However, the annotations are more preferably rendered user interface elements that identify and optionally provide information relating to the annotated item. For example, errors are preferably annotated. Annotating an error can include marking the error, providing an explanation of the error, providing a possible resolution, or adding any suitable supplemental information. An explanation of the error may use templating to use specific data from that unified log report. Annotation can similarly be used for other reasons such as showing log reports related to a subsection of a particular log report The log reports may have particular benefits to aiding in the process of providing customer support to users of the platform. Preferably, a customer care representative can be enabled to access and view log reports of an account. In one variation, a customer care agents is given privileges to view log reports with less sanitization than a customer account. For example, internal log information hidden from a customer agent may be viewable by the customer account. Additionally, the log report interface of a customer care agent may allow the agent to view the log reports as seen by the customer account. The method may additionally include establishing a synchronized browsing session between an account user and platform agent, which functions to allow the log report interface of a customer account to be at least partially controlled by a platform agent as shown in FIG. 11. A synchronized browsing session may be established by the customer account or the platform agent entering a shared code. Alternatively, a platform agent may invoke the sharing session by obtaining the account name. The synchronized browsing session may allow a platform agent to pull up appropriate logs, mark or annotate a log report, or perform any suitable control of the log report to facilitate helping a customer resolve a problem.

The method may additionally include replaying at least a subset of events recorded in a log report. The log report preferably is made up of several events, at least some of which are actions originating from the platform (e.g., outbound SIP or HTTP communication). The actions that were performed to result in an event record can be replayed in its original format or alternatively in an augmented format (e.g., changing a parameter of the action). An event replay debugging tool may be provided to allow any level of action replay such as single action replay, stepping through actions, or replaying a set of actions from a starting point as shown in FIGS. 9A and 9B. For example, if an application encountered an error when the platform talked to an application server of an account holder, the account holder could replay the HTTP request made to the application server. The HTTP message originally sent can be resent to the application server URI. The application server will preferably make a response. This response can be compared to the original response. The method preferably additionally includes comparing two log reports as shown in FIG. 9B. In the replay version, an original version can be compared to the replayed version. Differences can be highlighted revealing what is added and what is missing between at least two versions. The log report comparison can additionally be applied to any two or more log reports.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the platform log storage system and an information sanitization engine. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   executing communication processes in an application platform, which comprises on behalf of outside entities, negotiating communications between a set of internal resources and at least one external resource using at least a first communication protocol and a second protocol;
   capturing internal log information during execution of the application platform;
   receiving a request to access log information by an outside entity;
   synthesizing the internal log information of the first protocol and at least a second protocol into a unified communication report;
   transmitting the unified communication report;
   establishing a synchronized browsing session between a platform agent account and a customer account, wherein the unified communication report is communicated to a log report interface of the platform agent account and the customer account; and
   controlling the log report interface of the customer account through directives of the platform agent.

2. The method of claim 1, wherein negotiating communications comprises accessing procedural instructions from an external server using the second protocol, and wherein executing communication processes comprises processing at least a portion of the procedural instructions in determining communication processes.

3. The method of claim 1, wherein the first protocol is a session initiation protocol (SIP) signaling protocol and the second protocol is an application layer protocol.

4. The method of claim 3, wherein the application layer protocol is an HTTP type protocol.

5. The method of claim 1, further comprising detecting and classifying an error in the unified communication report.

6. The method of claim 5, wherein for at least one error classification, transmitting a communication to a configured destination.

7. The method of claim 6, wherein transmitting a communication to the configured destination comprises embedding a link to unified communication report.

8. The method of claim 5, further comprising annotating logs with supplemental information.

9. The method of claim 8, wherein the annotations include a recommended resolution to an error.

10. The method of claim 1, wherein the unified communication report communicated to the log report interface the platform agent is a first version of the log information, and the unified communication report communicated to the log report interface of the customer account is a sanitized version of the first version of the log information.

11. The method of claim 1, further comprising indexing the properties of the internal log information; wherein the request to access log information is a search query; and finding a set of sessions of log information that correspond to the search query.

12. The method of claim 1, wherein synthesizing the internal log information into a unified communication report can include partitioning the internal log information into a set of log information sessions according to a session definition; and within a log information session, collating log information of the first protocol and the second protocol into the unified communication report.

13. The method of claim 1, wherein transmitting the unified communication report comprises transmitting the unified communication report as a log report interface and providing an event replay option for at least a subset of the log events.

14. The method of claim 13, wherein in the log report interface, comparing an original event to an event resulting from a replayed event and presenting differences between the original event and the replayed event.

15. The method of claim 1, wherein synthesizing the internal log information of the first protocol and at least a second protocol further comprises sanitizing the internal log information, and wherein the unified communication report includes sanitized log information.

16. The method of claim 15, wherein sanitizing the internal log information comprises abstracting communication of multiple internal resources of the platform to a single proxy resource and anonymizing a set of parameters in the log information.

17. The method of claim 15, wherein sanitizing the internal log information comprises condensing a set of individual log events in the internal log information into a summarizing event.

18. The method of claim 15, wherein sanitizing the internal log information comprises setting the level of sanitizing according to an access policy associated with the outside entity.

\* \* \* \* \*